(12) United States Patent
Shibata et al.

(10) Patent No.: US 9,421,658 B2
(45) Date of Patent: Aug. 23, 2016

(54) APPARATUS HAVING CUP ATTACHING UNIT

(71) Applicant: NIDEK CO., LTD., Gamagori, Aichi (JP)

(72) Inventors: Ryoji Shibata, Toyokawa (JP); Katsuhiro Natsume, Toyohashi (JP); Yoshiaki Kamiya, Nagoya (JP); Kyoji Takeichi, Gamagori (JP)

(73) Assignee: NIDEK CO., LTD., Aichi (JP)

( * ) Notice: Subject to any disclaimer, the term of this patent is extended or adjusted under 35 U.S.C. 154(b) by 0 days.

(21) Appl. No.: 14/297,691

(22) Filed: Jun. 6, 2014

(65) Prior Publication Data

US 2014/0287660 A1    Sep. 25, 2014

Related U.S. Application Data

(63) Continuation-in-part of application No. 13/788,439, filed on Mar. 7, 2013.

(30) Foreign Application Priority Data

Mar. 9, 2012  (JP) .................. 2012-053862
Feb. 27, 2013 (JP) .................. 2013-036693

(51) Int. Cl.
    *B29C 59/00* (2006.01)
    *B24B 9/14* (2006.01)
    (Continued)

(52) U.S. Cl.
    CPC .............. *B24B 9/146* (2013.01); *B24B 9/144* (2013.01); *B24B 13/005* (2013.01); *B24B 13/0052* (2013.01); *B29D 11/00942* (2013.01); *B29D 11/00961* (2013.01)

(58) Field of Classification Search
    CPC ...... B24B 9/146; B24B 9/144; B24B 13/005; B24B 13/0052; B29D 13/00942; B29D 11/00961
    USPC ......................................................... 425/150
    See application file for complete search history.

(56) References Cited

U.S. PATENT DOCUMENTS 6,325,700 B1   12/2001  Mizuno et al.
6,427,094 B1    7/2002  Mizuno
(Continued)

FOREIGN PATENT DOCUMENTS

CN         100543519 C      9/2009

OTHER PUBLICATIONS

Search Report, dated Nov. 5, 2013, issued by the European Patent Office, in counterpart Application No. 13001140.6.
(Continued)

*Primary Examiner* — Joseph S Del Sole
*Assistant Examiner* — John Robitaille
(74) *Attorney, Agent, or Firm* — Sughrue Mion, PLLC

(57) ABSTRACT

A system includes: a cup attaching unit configured to attach a cup to a surface of an eyeglass lens; a processing apparatus main body that includes a housing in which a lens processing mechanism with a processing tool configured to process the eyeglass lens held by a lens chuck shaft is arranged; a display which is arranged at the housing and is configured to display an operation step; a signal input unit configured to input a switching signal to switch a screen of the display from a screen for a current operation step to a screen for a next operation step; and a controller configured to control the display to switch displaying the screen of the display from the screen for the current operation step to the screen of the next operation step based on the switching signal input by the signal input unit.

17 Claims, 10 Drawing Sheets

(51) Int. Cl.
*B24B 13/005* (2006.01)
*B29D 11/00* (2006.01)

(56) References Cited

U.S. PATENT DOCUMENTS

| | | |
|---|---|---|
| 6,798,501 B1 | 9/2004 | Mizuno |
| 7,937,826 B2 | 5/2011 | Matsuyama |
| 2002/0144516 A1 | 10/2002 | Mizuno |
| 2003/0129925 A1 | 7/2003 | Toyoshima et al. |
| 2007/0213861 A1* | 9/2007 | Takeichi ......................... 700/98 |
| 2008/0231794 A1* | 9/2008 | Yanagi et al. .................. 351/41 |
| 2008/0239700 A1 | 10/2008 | Matsumoto |

OTHER PUBLICATIONS

Nidek, Ltd.; Owners Manual for Edging Station LE-700; Jun. 21, 2013; 182 pages total.

Office Action issued on Mar. 16, 2016, by the State Intellectual Property Office of P.R. China in counterpart Chinese Application No. 201310076557.9.

* cited by examiner

APPARATUS HAVING CUP ATTACHING UNIT

This application is a Continuation-In-Part (CIP) of U.S. patent application Ser. No. 13/788,439 filed Mar. 7, 2013, which claims priority from Japanese Patent Application No. 2012-053862 filed Mar. 9, 2012, and Japanese Patent Application No. 2013-036693 filed Feb. 27, 2013, the contents of all of which are incorporated herein by reference in their entireties.

BACKGROUND

The present invention relates to an apparatus having a cup attaching unit for attaching cup which is a processing tool to a surface of an eyeglass lens.

When the peripheral edge of an eyeglass lens is processed, a process of obtaining a target lens shape by measuring the shape of the rim of an eyeglass frame using an eyeglass frame shape measuring device, a process of attaching a cup which is a processing tool to the front surface of the lens using a cup attaching device (blocker), a process of inputting processing conditions of the lens, and a process of holding the lens to which the cup is attached with lens chuck shafts included in an eyeglass lens processing apparatus body to perform processing of the peripheral edge of the lens on the basis of the target lens shape and the processing conditions are performed. The eyeglass frame shape measuring device and the cup attaching device are separated from the processing apparatus body. However, a system in which the eyeglass frame shape measuring device is assembled into the processing apparatus body (for example, refer to JP-A-2000-314617) and a system in which the eyeglass frame shape measuring device is assembled into the cup attaching device (for example, refer to JP-A-2007-275998) are suggested. In addition, there is a manual type cup attaching device configured to mount a cup to the front surface of an eyeglass lens by a manual operation of an operator (refer to JP-A-2008-246634).

SUMMARY

However, in the apparatus according to the related art, a system for performing each of the processes including the process of attaching the cup to the front surface of the lens after obtaining the target lens shape, the process of performing processing of the lens by the eyeglass lens processing apparatus body, and the like is not integral, and thus an operator needs to perform each work while recognizing each of the processes. When the devices are independent from each other, an unskilled operator may get bewildered by correlations therebetween and the work order, resulting in a reduction in work efficiency. In addition, when the devices are independent from each other, an installation space needs to be ensured.

In addition, in the manual type cup attaching device according to the related art as in Patent Document 3, the attaching portion to which the base portion of the cap is attached is fixed while facing downward, and thus the operator is difficult to mount the cup to the attaching portion.

A technical object of the invention is to provide an apparatus capable of achieving an improvement in the apparatus according to the related art. In addition, another technical object of the invention is to provide an apparatus capable of improving operability. In addition, another technical object of the invention is to provide an apparatus capable of enabling works to be smoothly performed. In addition, another technical object of the invention is to provide an apparatus capable of achieving an increase in the efficiency of works.

In order to accomplish the objects, the invention has the following configurations.

A system comprising:
a cup attaching unit configured to attach a cup, which is a processing jig, to a surface of an eyeglass lens;
a processing apparatus main body that includes a housing in which a lens processing mechanism with a processing tool configured to process a periphery of the eyeglass lens held by a lens chuck shaft is arranged;
a display which is arranged at the housing and is configured to display an operation step;
a signal input unit configured to input a switching signal to switch a screen of the display from a screen for a current operation step to a screen for a next operation step; and
a controller configured to control the display to switch displaying the screen of the display from the screen for the current operation step to the screen of the next operation step based on the switching signal input by the signal input unit.

An system comprising:
a cup attaching unit configured to attach a cup, which is a processing jig, to a surface of an eyeglass lens;
a processing apparatus main body that includes a housing in which a lens processing mechanism with a processing tool to process a periphery of the eyeglass lens held by a lens chuck shaft is arranged;
a display that is arranged in the housing;
a detection unit that is arranged in the vicinity of the cup attaching unit and is configured to detect that the cup is attached to the surface of the lens by the cup attaching unit;
a signal input unit configured to input a switching signal when the detection unit detects that the cup is attached to the surface of the lens by the cup attaching unit; and
a control unit configured to control the display to display a guidance screen for switching on the display from a first screen indicating that the operation step proceeds to the cup attaching operation by the cup attaching unit to a second screen indicating that the operation step proceeds to a stage in which the lens can be processed by the lens processing mechanism, based on the input of the switching signal, or control the display to switch the screen on the display from the first screen to the second screen based on the input of the switching signal.

An system comprising:
a cup attaching unit configured to attach a cup, which is a processing jig, to a surface of an eyeglass lens;
a processing apparatus main body that includes a housing in which a lens processing mechanism with a processing tool to process a periphery of the eyeglass lens held by a lens chuck shaft is arranged;
a display that is arranged in the housing;
a detection unit that is arranged in the vicinity of the cup attaching unit and is configured to detect that the cup is attached to the surface of the lens by the cup attaching unit;
a signal input unit configured to input a switching signal when the detection unit detects that the cup is attached to the surface of the lens by the cup attaching unit; and
a control unit configured to control the display to display a guidance screen for switching on the display from a first screen indicating that the operation step proceeds to the cup attaching operation by the cup attaching unit for one of on right and left lenses to a second screen indicating that the operation step proceeds to the cup attaching operation by the cup attaching unit for the other of the right and left lenses based on the input of the switching signal, or control the display to switch the screen on the display from the first screen to the second screen based on the input of the switching signal.

According to the invention, the improvement in the apparatus according to the related art may be achieved. In addition, the improvement in operability may be achieved. In addition, works may be smoothly performed even by an unskilled operator. In addition, an increase in efficiency of works may be achieved.

DESCRIPTION OF EXEMPLARY EMBODIMENTS

Figure 1:
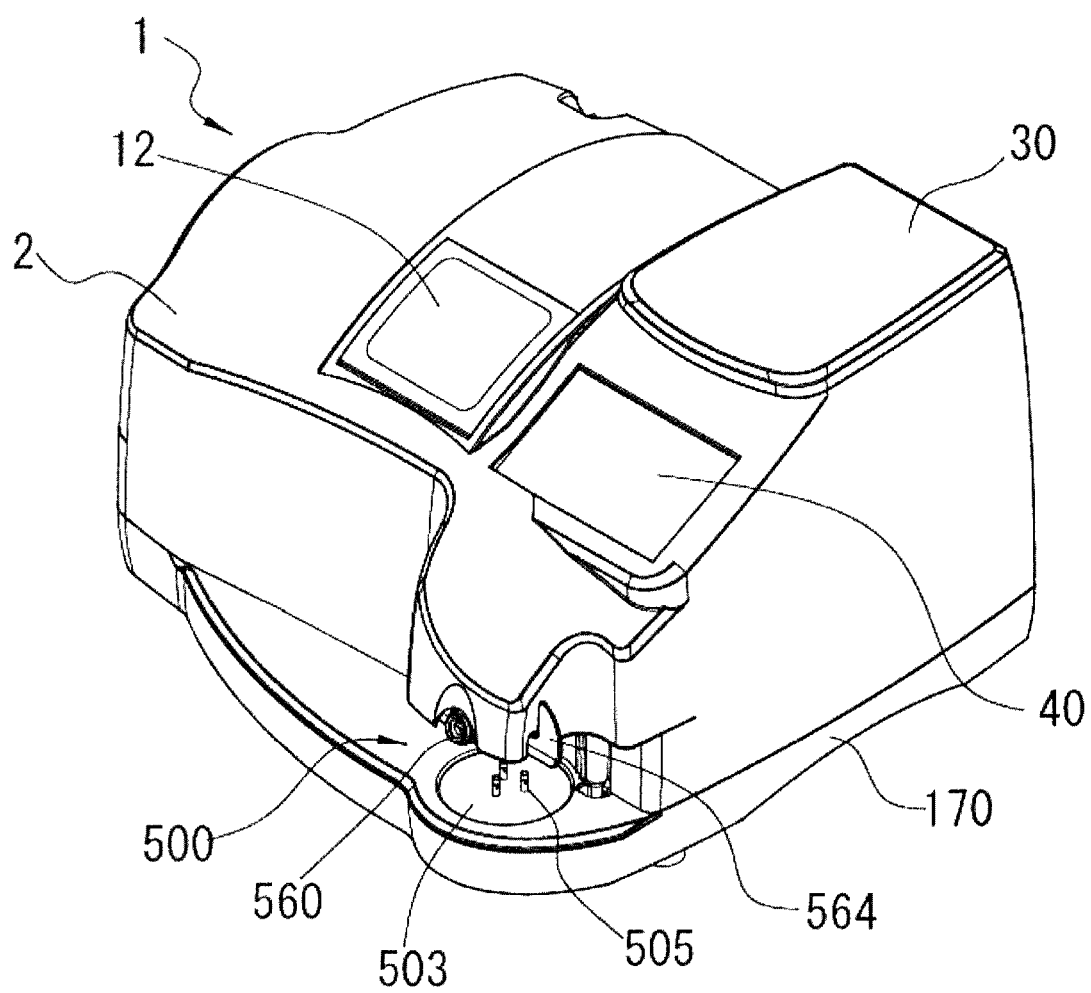
FIG. 1 is a perspective view of the external form of an eyeglass lens processing apparatus.

Hereinafter, an embodiment of the invention will be described with reference to the drawings. FIG. 1 is a perspective view of an external form as a schematic configuration diagram of an eyeglass lens processing apparatus.

A processing apparatus body 1 includes: a base 170; a lens processing mechanism section 10 (see FIG. 2) disposed in a housing 2 of the processing apparatus body 1; a window (door) 12 which is able to be opened and closed to take an eyeglass lens in and out of the lens processing mechanism section 10, the window 12 being disposed in the vicinity of the center in the left and right direction on the surface of the housing 2; an eyeglass frame shape measuring unit 30 which is disposed at the rear right side of the housing 2 with respect to the window 12; a display unit 40 which is disposed on the surface of the housing 2 in front of the eyeglass frame shape measuring unit 30 on the right of the window 12; and a blocker unit (cup attaching unit) 500 which is disposed in front of the display unit 40 at the front right side of the housing 2 in order to mount a cup which is a processing tool to the surface of the eyeglass lens. The lens processing mechanism section 10, the eyeglass frame shape measuring unit 30, the display unit 40, and the blocker unit 500 are mounted to the base 170 in one body.

The display unit 40 is disposed at the rear right side of the housing 2 with respect to the window 12. The eyeglass frame shape measuring unit 30 is disposed in the rear of the housing 2 with respect to the display unit 40. The blocker unit 500 is disposed in the front of the housing 2 with respect to the display unit 40. In this embodiment, as viewed from an operator, the display unit 40 is disposed at the right side of the window 12, the eyeglass frame shape measuring unit 30 is disposed at the rear right side, and the blocker unit 500 is disposed at the front right side. The display unit 40, the eyeglass frame shape measuring unit 30, and the blocker unit 500 may also be disposed on the left of the window 12.

The eyeglass frame shape measuring unit 30 has a frame holding mechanism that holds an eyeglass frame, and a measuring mechanism which measures the three-dimensional shape of a rim by detecting the movement of a tracing stylus inserted into the groove of the rim of the eyeglass frame. The eyeglass frame shape measuring unit 30 may use a unit that has a well-known configuration.

The display unit 40 has a display with a touch panel function. As the operator touches a switch displayed on the screen of the display unit 40, a signal corresponding to a display of the switch is input. In addition, the display unit 40 is used in common in a stage of measuring the shape of a rim by the eyeglass frame shape measuring unit 30, a stage of attaching a cup by the blocker unit 500, and a stage of processing a lens LE by the lens processing mechanism section 10.

Figure 2:
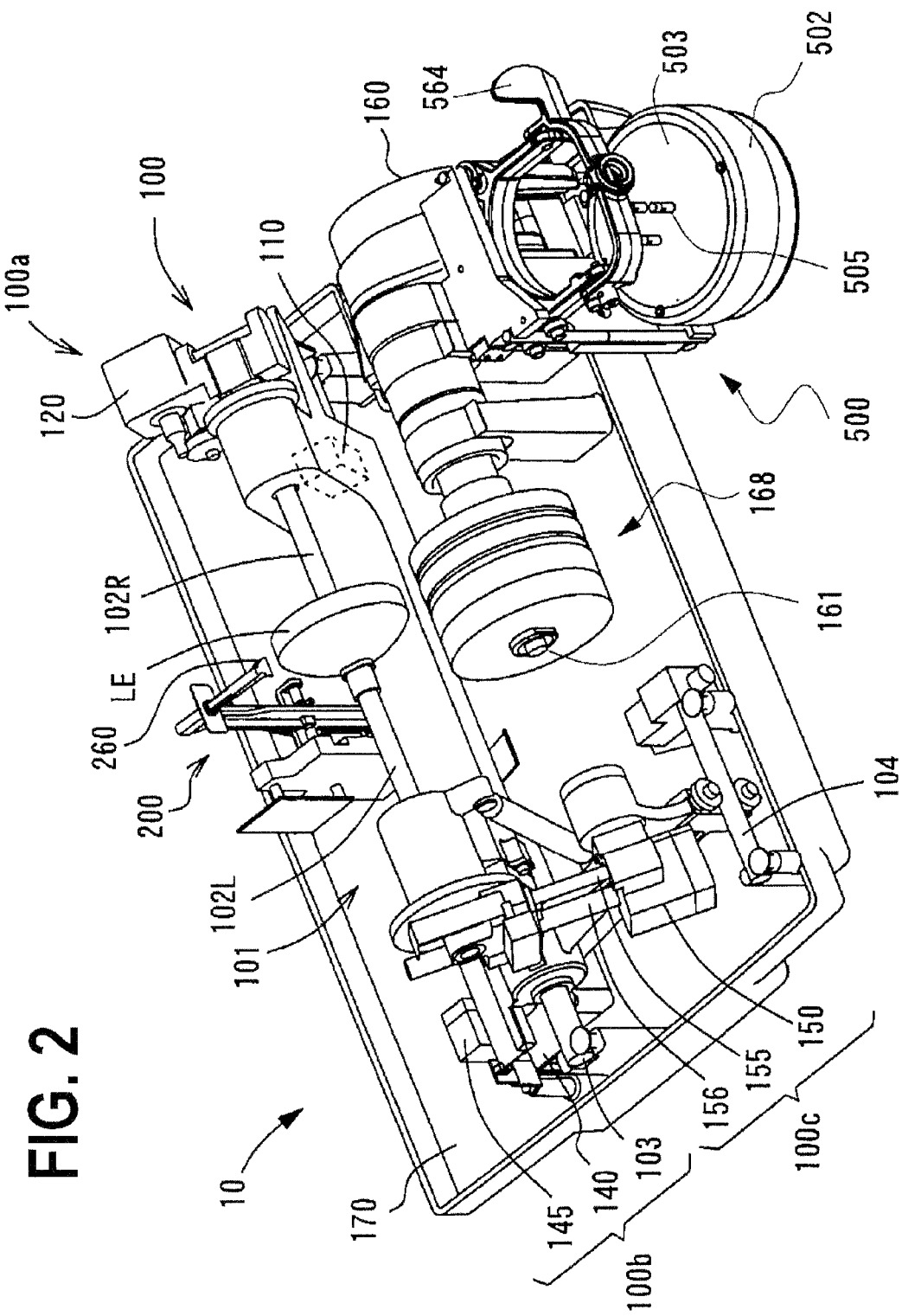
FIG. 2 is a schematic configuration diagram of a lens processing mechanism section.

FIG. 2 is a schematic configuration diagram of the lens processing mechanism section 10 disposed in the housing 2. The processing apparatus body 1 includes a lens holding section 100 having lens chuck shafts to hold a lens LE to be processed, and a processing tool rotating unit 160 that rotates a processing tool rotating shaft 161a to which a lens processing tool 168 for processing the peripheral edge of the lens is attached.

The processing tool rotating unit 160 is disposed in the front of the base 170. The lens processing tool 168 is constituted by a roughing grindstone, a bevel-processing and plano-processing finishing grindstone, a flat-polish-finishing grindstone, and the like. The processing tool rotating shaft 161a is rotated by a motor 161.

The lens holding section 100 includes: a lens rotating unit 100a that rotates a pair of lens chuck shafts 102L and 102R; an X-direction moving unit (chuck shaft moving unit) 100b that moves the lens chuck shafts 102L and 102R disposed in a carriage 101 in an axial direction (X direction); and a Y-direction moving unit (inter-shaft distance changing unit) 100c that moves the lens chuck shafts 102L and 102R in such a direction (Y direction) to approach or to be distant from the processing tool rotating shaft 161a.

The lens rotating unit 100a has a motor 120 that rotates the pair of lens chuck shafts 102L and 102R held in the carriage 101. In addition, a motor 110 for moving the lens chuck shaft 102R toward the lens chuck shaft 102L to nip the lens LE between the lens chuck shafts 102L and 102R is disposed in the carriage 101. The base portion of a cup CU attached to the front surface of the lens LE is attached to a cup holder (illustration thereof is omitted) disposed on the lens chuck shaft 102L.

The X-direction moving unit 100b has a motor 145. The carriage 101 is mounted on an X-axis movement support base 140 that is able to move along shafts 103 and 104 extending in the X direction. The carriage 101 is linearly moved in the X direction along with the support base 140 by the rotation of the motor 145.

The Y-direction moving unit 100c has a motor 150 mounted on the support base 140. The rotation of the motor 150 is transmitted to a ball screw 155 extending in the Y direction, and the carriage 101 is moved in the Y direction by the rotation of the ball screw 155.

The lens LE held by the lens chuck shafts 102L and 102R is moved in the X direction by the X-direction moving unit 100b such that the position in the X direction thereof with respect to the lens processing tool 168 is changed. In addition, the distance of the lens LE from the processing tool rotating shaft 161a is changed by the Y-direction moving unit 100c so as to be subjected to peripheral edge processing based on a target lens shape.

In the rear of the carriage 101, a lens shape measuring unit 200 is disposed. The lens shape measuring unit 200 has a tracing stylus 260 that comes into contact with the front surface and the rear surface of a lens, and the shapes of the front surface and the rear surface of the lens are measured by detecting the movement position of the tracing stylus 260. During lens shape measurement, the lens LE is rotated and the Y-direction moving unit 100c is driven on the basis of a target lens shape, and the position in the X direction of the refractive surface of the lens with which the tracing stylus 260 comes into contact is detected by a sensor (not shown).

Figure 3A:
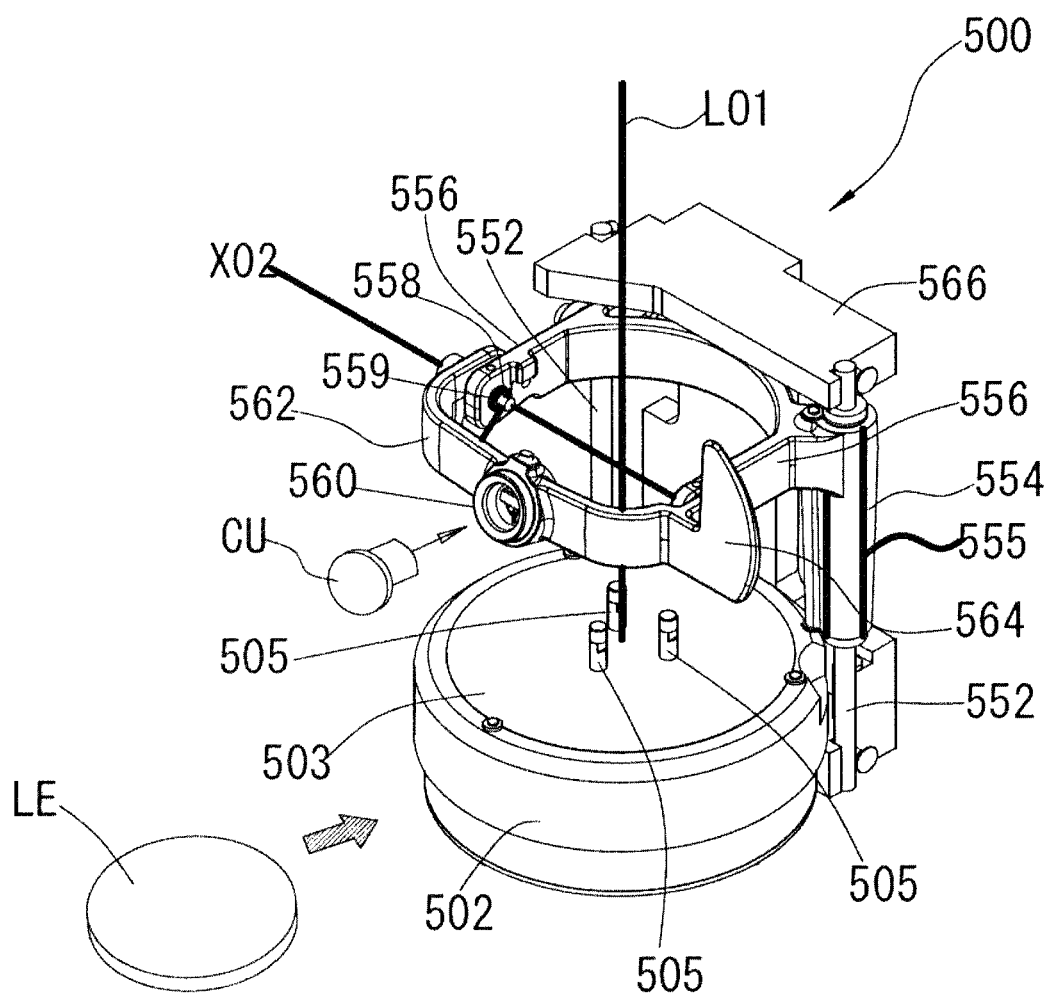
FIG. 3A is a schematic configuration diagram of a blocker unit.
Figure 3B:
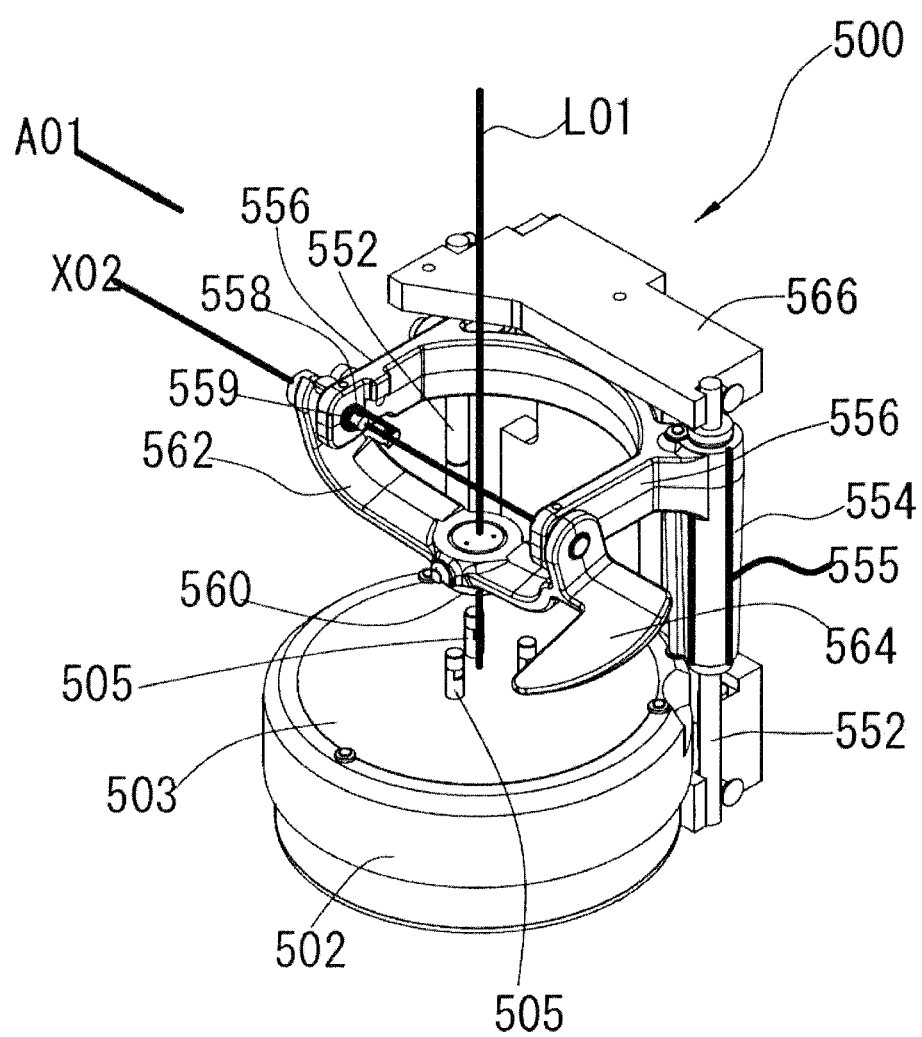
FIG. 3B is a schematic configuration diagram of the blocker unit.
Figure 3C:
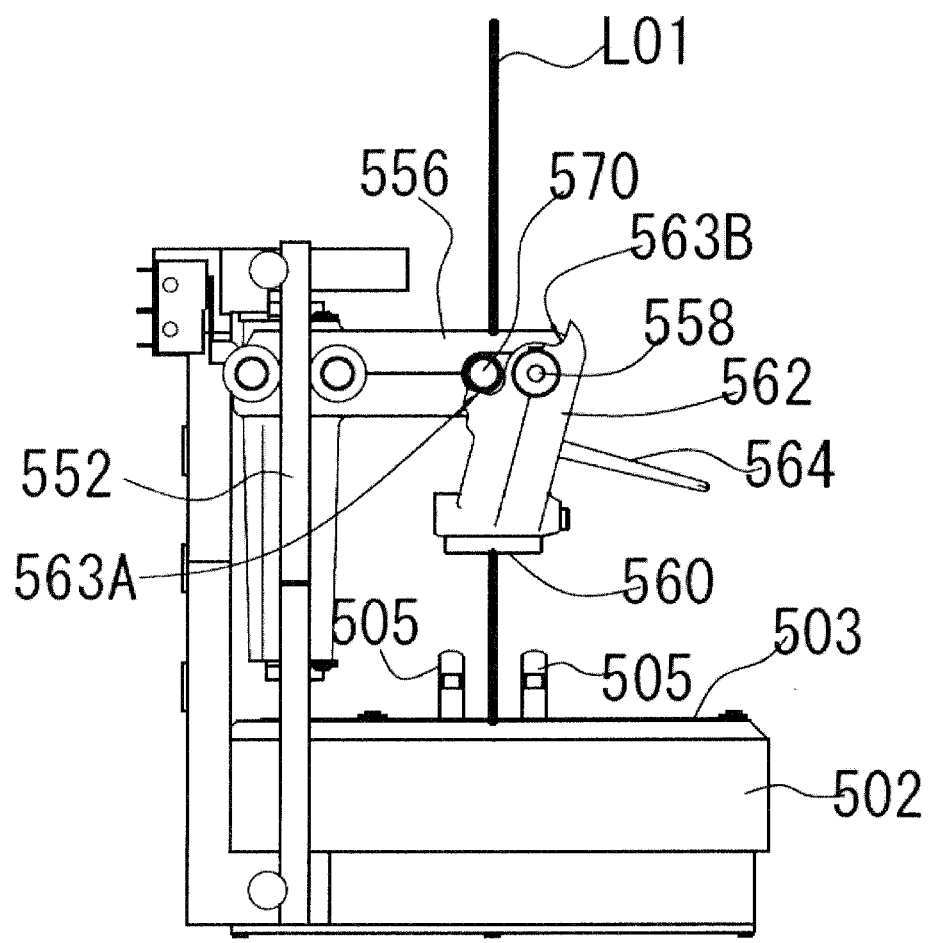
FIG. 3C is a diagram of the blocker unit of FIG. 3B viewed in an arrow A01 direction.
Figure 4:
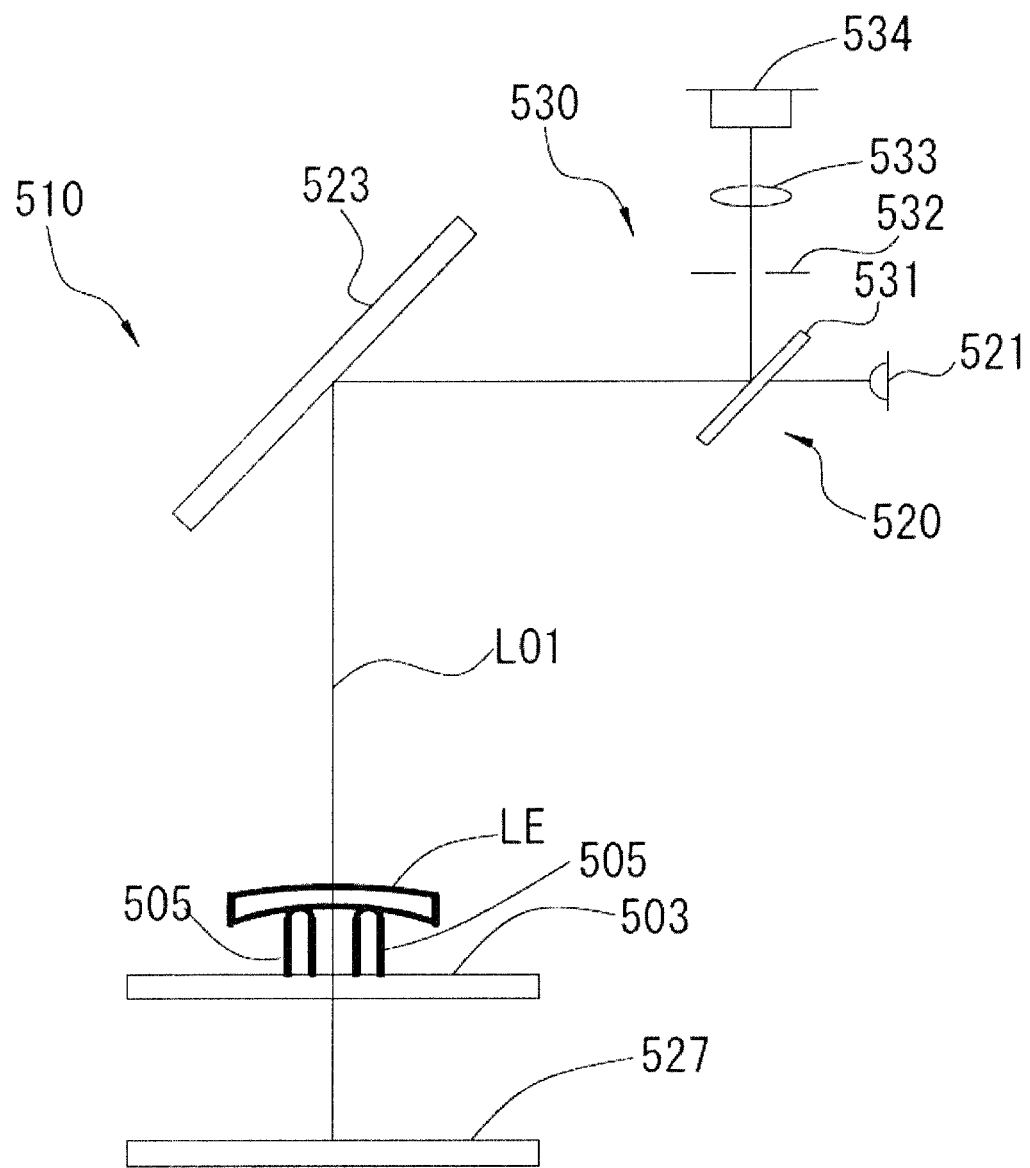
FIG. 4 is a diagram of an optical system disposed in the blocker unit.

FIG. 3A is a schematic configuration diagram of the blocker unit 500. FIG. 3B is a diagram of a state where a cup attaching portion 560 in FIG. 3A is directed downward. FIG. 3C is a diagram of the blocker unit 500 of FIG. 3B viewed in an arrow A01 direction. FIG. 4 is a diagram of an optical system disposed in the blocker unit 500. The blocker unit 500 includes lens support portions (support pins 505) disposed to support the lens LE on a reference axis L01 extending in the vertical direction, a support arm 562 to which the attaching portion 560 to which the base portion of the cup CU is attached is attached, moving arms 556 that hold the support arm 562 to be rotatable about an axis extending in the lateral direction as the center, and are movable in the upward and downward direction which is the direction of the reference axis L01. The moving arms 556 hold the support arm 562 to be rotatable about an axis X02 extending in the lateral direction so that the attaching portion 560 is directed in a first direction which is a downward direction, a forward direction in which the operator is positioned with respect to the blocker unit 500, or a second direction which is an upward direction.

In addition, the blocker unit 500 has a lever 564 operated by the operator to rotate the support arm 562 so that the attaching portion 560 is directed in the first direction from the second direction. The lever is disposed in the support arm, and preferably, is also used as an operation member for lowering the cup CU attached to the attaching portion 564 along with the moving arms 556 by the operator after the attaching portion 564 is directed in the first direction.

In addition, it is preferable that the blocker unit have a first impelling member (spring 555) that impels the moving arms 556 in the upward direction, a second impelling member (spring 559) that applies an impelling force to rotate the support arm so that the attaching portion is directed in the second direction from the first direction, and a restriction portion 570 that restricts rotation of the support arm so that the center of the attaching portion is positioned on the reference axis L01 when the support arm is rotated to cause the attaching portion to be directed in the first direction.

In addition, the impelling force of the first impelling member is set to be greater than the impelling force of the second impelling member. Moreover, it is preferable that the impelling force of the first impelling member be greater than a moment load in the lever when the support arm is rotated by the impelling force of the second impelling member. In addition, it is preferable that the second direction in which the attaching portion is directed be in a range of a direction rotated toward the operator side by 45 degrees to 180 degrees with respect to the downward direction of the reference axis L01.

A specific example of a cup attaching mechanism of the blocker unit 500 is as follows. In FIGS. 3A and 3B, a transparent plate 503 is disposed on a pedestal 502. On the transparent plate 503, three support pins (lens support portions) 505 are provided about a reference axis L01 for cup attaching as the center. The lens LE is placed on the support pins 505. Two support columns 552 are attached to extend upward from the pedestal 502. The upper ends of the support columns 552 are supported by a block 566. Movement support bases 554 to which the moving arms 556 are integrally attached are attached to the support columns 552 to be movable in the upward and downward direction. The spring 555 as the impelling member that always impels the movement support base 554 in the upward direction is disposed in the movement support base 554. Two arms 556 are disposed to extend forward from the movement support base 554. A shaft 558 which is a coaxial with the axis X02 that extends in the lateral direction is mounted to the front portion of the arm 556.

The support arm 562 that supports the cup attaching portion 560 is held by the arm 556 to rotate about the shaft 558 (the axis X02) so that the cup attaching portion 560 is directed forward (forward an operator) and the cup attaching portion 560 is directed downward. The base portion of the cup CU which is a tool for holding the lens LE with the lens chuck shafts 102L and 102R of the lens LE is mounted to a hole provided in the cup attaching portion 560. In addition, a lever 564 for enabling the operator to rotate the support arm 562 is fixed to the support arm 562. The lever 564 has a plate shape.

The coil spring 559 as the impelling member is disposed in the shaft 558. When the operator does not operate the lever 564, the coil spring 559 applies an impelling force to rotate the support arm 562 so that the attaching portion 560 is directed in the second direction (forward direction) from the downward direction. In addition, the impelling force of the spring 555 is set to be greater than the impelling force of the coil spring 559.

When the lever 564 is operated by a finger of the operator and the support arm 562 is rotated so that the center of the cup attaching portion 560 is positioned on the reference axis L01 as illustrated in FIGS. 3B and 3C, the restriction portion 570 for restricting the rotation of the support arm 562 is provided in the moving arms 556. In FIG. 3C, as a cut-off part 563A formed in the support arm 562 abuts on the restriction portion 570, the rotation of the support arm 562 is restricted in a state where the cup attaching portion 560 is directed in the downward direction.

In addition, separately from the cut-off part 563A, a cut-off part 563B is formed in the support arm 562. When the cup attaching portion 560 is rotated to be directed in the forward direction by the coil spring 559, the cut-off part 563B abuts on the restriction portion 570 such that the rotation of the support arm 562 is restricted. The restriction portion 570 is also used as a restriction portion that restricts rotation of the support arm 562 to cause the cup attaching portion 560 to be directed in the second direction.

In addition, the lever 564 extends substantially in the upward direction as illustrated in FIG. 3A when the attaching portion 560 is directed in the forward direction (second direction), and the lever 564 is disposed to extend substantially in the horizontal direction (in a range of ±30 degrees with respect to a surface orthogonal to the reference axis L01) when the attaching portion 560 is directed in the downward direction (first direction). Therefore, the operator continuously performs an operation of the lever 564 when the attaching portion 560 is directed in the downward direction from the forward direction and an operation of the lever 564 when the attaching portion 560 is lowered toward the lens LE placed on the support pins 505 in association with each other.

In addition, the second direction in which the attaching portion 560 is directed is a direction in which the operator substantially faces the front in the example of FIG. 3A. However, the second direction in which the attaching portion 560 is directed may be a range of a direction rotated by 45 degrees to 180 degrees with respect to the downward direction of the reference axis L01. In this range, the base portion of the cup CU may be attached to the attaching portion 560 while the operator views the hole of the attaching portion 560.

A cup attaching operation by the cup attaching mechanism as described above will be described. When the operator does not operate the lever, as illustrated in FIG. 3A, the attaching portion 560 is in a state of being directed in the forward direction (second direction) by the coil spring 559. The operator mounts the base portion of the cup CP to the attaching portion 560 in this state. Here, the operator is able to check the hole of the attaching portion 560, and thus it is easy to mount the base portion of the cup CU to the attaching portion 560.

The operator operates the lever 564 and rotates the lever 564 directed in the upward direction toward the forward direction. Here, an impelling force is applied by the coil spring 559 in the direction in which the operator rotates the lever 564. When the operator rotates the lever 564 against the impelling force, the rotation of the support arm 562 (the attaching portion 560) is restricted by the restriction portion 570. Here, a state in which the attaching portion 560 is directed in the downward direction is achieved, and the lever 564 is substantially in the horizontal direction, and a force of the operator for operating the lever 564 is in the downward direction. In addition, an impelling force in the upward direction is applied to the moving arms 556 to which the support arm 562 is attached by the spring 555. However, since the impelling force of the spring 555 is set to be greater than the impelling force of the coil spring 559, the moving arms 556 are not lowered until the rotation of the support arm 562 is restricted by the restriction portion 570. After the rotation of the support arm 562 is restricted by the restriction portion 570, when the operator continuously presses the lever 564, the pressing force is directed in the downward direction, and thus the attaching portion 560 and the cup CU are lowered along with the moving arms 556. Accordingly, the cup CU is fixed to the front surface of the lens LE.

After fixing of the cup CU to the lens LE is completed, when the operator raises the finger in the upward direction and removes the finger from the lever 564, the support arm 562 is raised along with the moving arms 556 by the spring 555, and the rotation of the support arm 562 is returned to its original state by the coil spring 559. Accordingly, the position and the direction of the attaching portion 560 are returned to the initial states.

In the apparatus of JP-A-2008-246634, the operator need to perform a first operation of rotating an arm having a attaching portion into which a cup is inserted in the horizontal direction about an axis in the upward and downward direction as the center, and a second operation of lowering the arm. However, the direction of the first operation and the direction of the second operation are different, have no association in the operation directions, and have no continuity. Contrary to this, in the blocker unit 500 described in the specification, after performing the operation of bringing down the lever 564 directed in the upward direction to be lowered, the operator performs the operation of continuously pressing the lever 564 in the downward direction, thereby fixing the cup to the lens.

FIG. 4 is a diagram of the optical system disposed in the blocker unit 500. The blocker unit 500 includes an illumination optical system 520 that illuminates the lens LE, and an imaging optical system 530 that takes an image of the lens LE. The illumination optical system 520 includes: a light source 521 such as an LED that emits white light; a mirror 523 that changes the direction of the illumination light; and a retroreflective member 527 disposed at the lower side of the transparent plate 503. The retroreflective member 527 is a member that has a characteristic of reflecting incident light in its original incident direction. The lens LE placed on the support pins 505 is illuminated from the below by the retroreflective member 527.

The imaging optical system 530 uses the mirror 523 of the illumination optical system 520 in common, and a half mirror 531 is disposed between the mirror 523 and the light source 521. In the reflected direction of the half mirror 531, an aperture 532, a lens 533, and an imaging element (camera) 534 are disposed. The aperture 532 is disposed at a position that is substantially a conjugate of the light source 521 via the half mirror 531. The optical axis of the imaging optical system 530 (the lens 533) is disposed to be aligned with the reference shaft L01. In addition, the focal position of the imaging optical system 530 is set to substantially focus on the surface of the lens LE placed on the support pins 505. The image of the front surface side of the lens LE is imaged by the imaging element 534 of the imaging optical system 530. The image of the lens LE taken by the imaging element 534 is displayed on the display unit 40.

Figure 5:
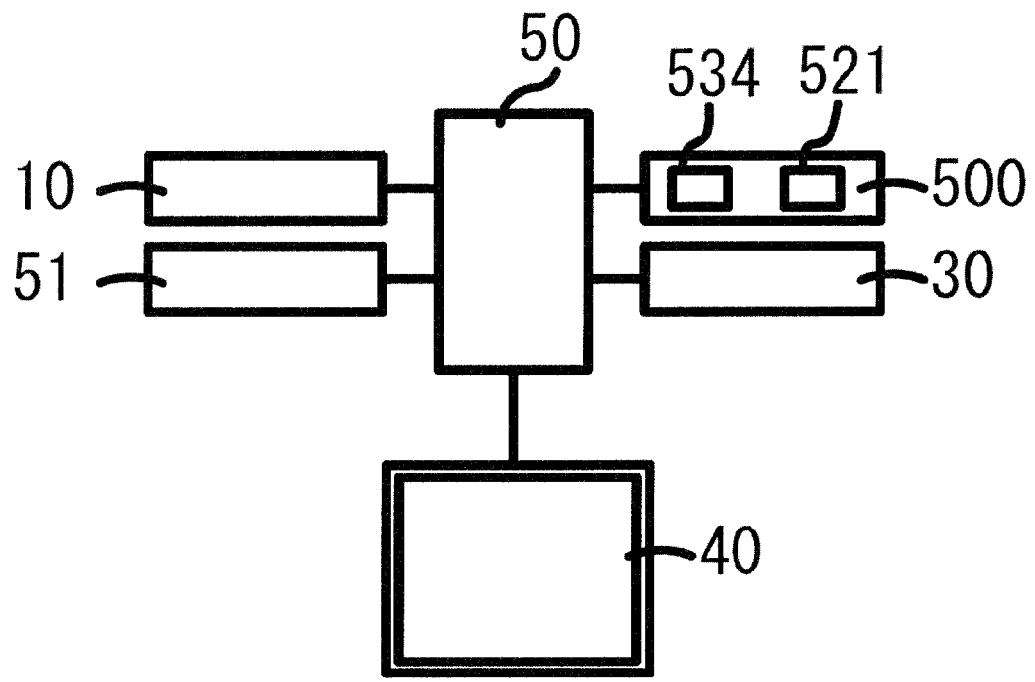
FIG. 5 is a control block diagram associated with the eyeglass lens processing apparatus.

FIG. 5 is a control block diagram associated with the eyeglass lens processing apparatus. A memory 51, the lens processing mechanism section 10, the eyeglass frame shape measuring unit 30, the display unit 40, and the blocker unit 500 are connected to a control section 50. The control section 50 receives an input signal through the touch panel function included in the display unit 40 and controls a display of figures and information on the screen.

In addition, the display unit 40 is used in common in the stage of measuring the shape of a rim by the eyeglass frame shape measuring unit 30, the stage of attaching the cup by the blocker unit 500, and the stage of processing the lens LE by the lens processing mechanism section 10. In addition, through the display unit 40 as the center, the operator has the display unit 40 as the center in the arrangement of the window 12, the eyeglass frame shape measuring unit 30, and the blocker unit 500 as described above, and thus the movement of the line of sight of a worker and the distance of the flow line of a work are shortened. Therefore, the operator may efficiency perform the work in each stage.

Next, the operations of the apparatus will be described. FIGS. 6 to 12 are examples of screens switched and displayed on the display unit 40. In each of the diagrams, a switch 404a is a switch that inputs a signal for switching to a screen of the next operation order. The control section 50 sequentially switches predetermined screens according to each of the operations processes including rim shape measurement, cup attaching, and lens processing on the basis of the input signal for screen switching by the switch 404a and displays the screens on the display unit 40.

Figure 6:
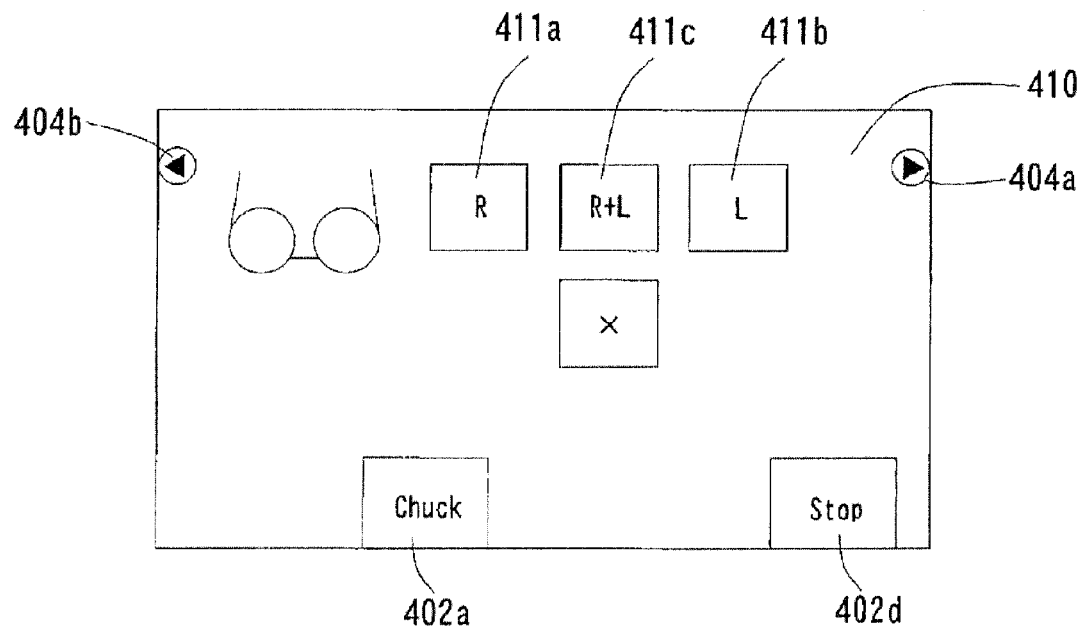
FIG. 6 is an example of a screen switched and displayed on a display unit.
Figure 7:
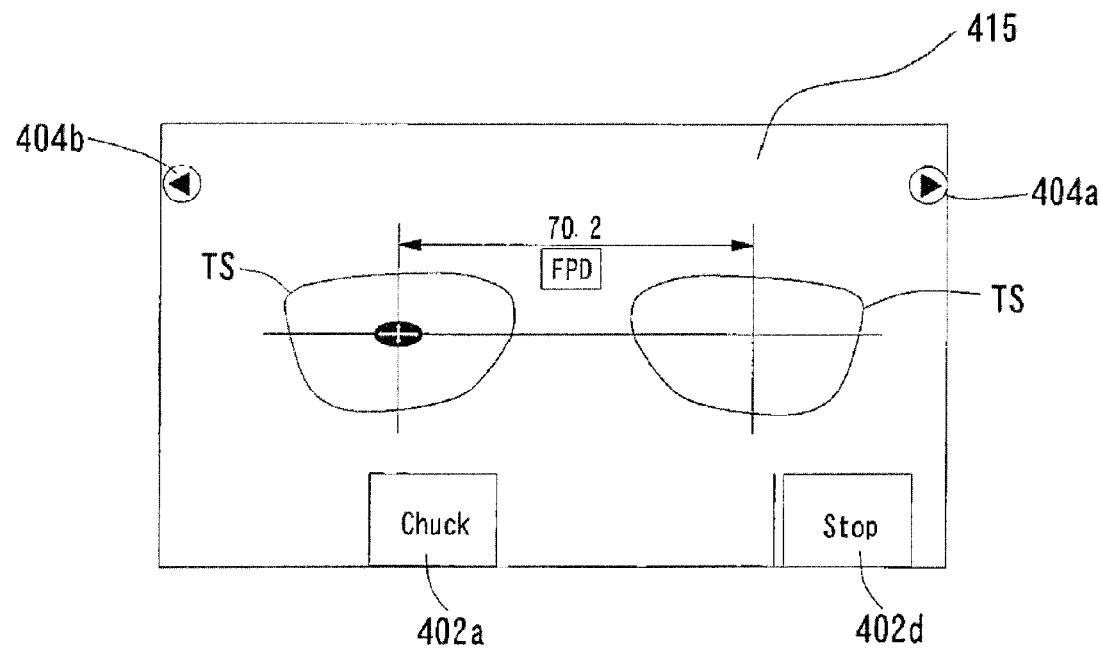
FIG. 7 is an example of a screen switched and displayed on a display unit.

As the initial work process, first, the operator performs measurement of the shape of the rim of an eyeglass frame using the eyeglass frame shape measuring unit 30. When a trace mode is selected from a menu screen (illustration thereof is omitted) displayed on the display unit 40, as illustrated in FIG. 6, a screen 410 for starting the measurement by the eyeglass frame shape measuring unit 30 is displayed on the display unit 40. On the screen 410, a switch 411a for starting measurement of the right rim of the eyeglass frame, a switch 411b for starting measurement of the left rim, and a switch 411c for sequentially starting the measurements of the right rim and the left rim are displayed.

In FIG. 6, the switch 404a is a switch that inputs a signal for switching to a screen of the next process. A switch 404b is a switch that inputs a signal for returning to the previous screen. In addition, a switch 402a is a switch that sends a command to nip the lens LE with the pair of lens chuck shafts 102L and 102R included in the lens processing mechanism section 10. A switch 402d is a switch that inputs a signal for stopping lens processing on the way. The switches 402a and 402d may not be displayed on the screens in stages in which processing of the lens LE is not performed.

When the switch 411c of FIG. 6 is selected and measurements of the right rim and the left rim are performed by the eyeglass frame shape measuring unit 30, the measurement result (target lens shape) is stored (input) in the memory 51. After measurements of the shapes of the rims, when the switch 404a is pushed, the screen of the display 40 is switched to a screen 415 illustrated in FIG. 7. In the screen 415, target lens shape figures TS are displayed as the target lens shapes of the left rim and the right rim. In addition, a value indicating a frame papillary distance FPD between the left and right rims is displayed through the measurements of the left and right rims. As the screen 415 is displayed, the operator is able to see that the left and right target lens shapes are obtained by the eyeglass frame shape measuring unit 30 and is able to confirm the shapes of the target lens shapes.

Figure 8:
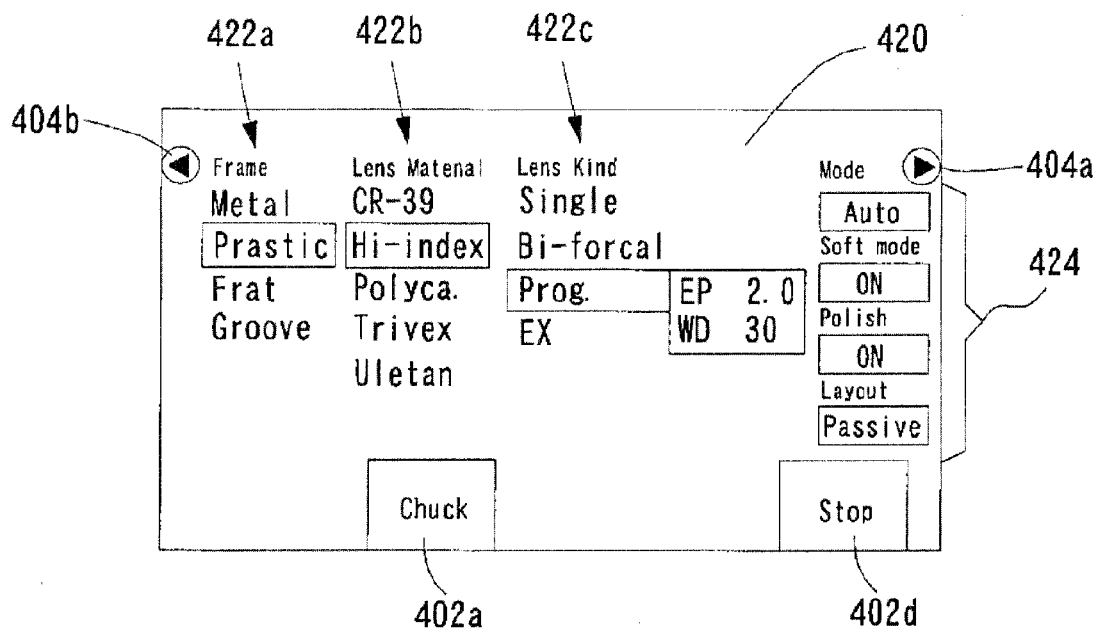
FIG. 8 is an example of a screen switched and displayed on a display unit.

Next, when the switch 404a is pushed, the screen of the display 40 is switched to a screen 420 for inputting processing conditions for the lens LE as illustrated in FIG. 8. By displaying the screen 420, the operator may recognize that inputting of processing conditions is needed in this stage. On the screen 420, the material of the eyeglass frame may be selected by a switch of a display portion 422s, the material of the lens LE may be selected by a switch of a display portion 422n, and the kind of the lens LE (single vision lens, bifocal lens, progressive lens, and the like) may be selected by a switch of a display portion 422c. In addition, processing modes (bevel-processing, plano-processing, and the like) and chamfering may be selected by switches of a display portion 424. In addition, in the display portion 424, a switch that selects the center of attaching of the cup with respect to the lens LE from the optical center of the lens and the center of the target lens shape is disposed.

Figure 9:
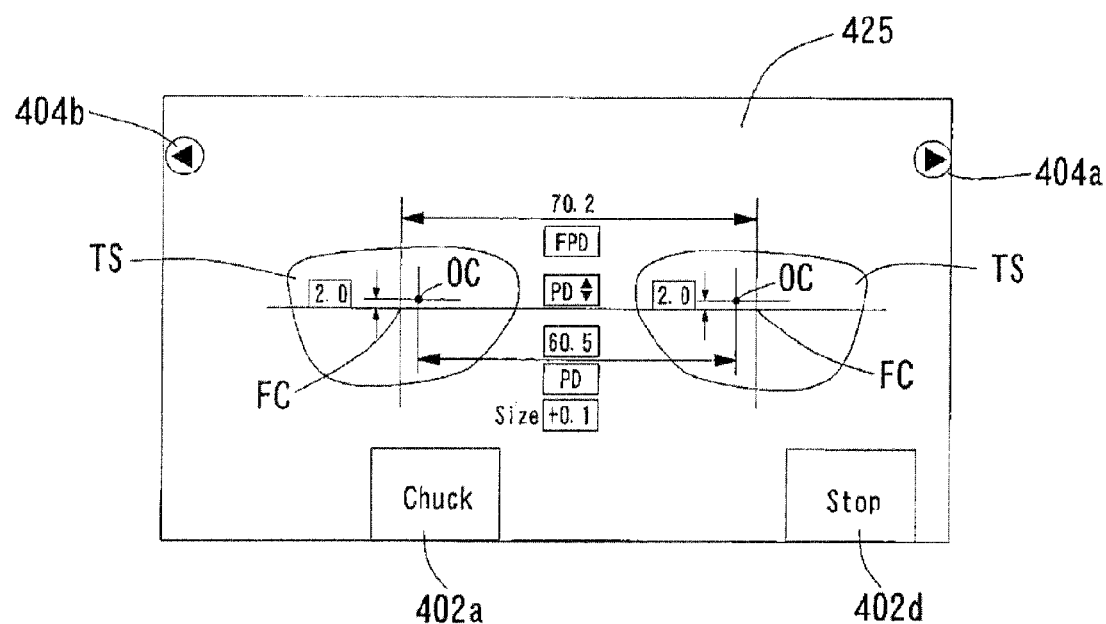
FIG. 9 is an example of a screen switched and displayed on a display unit.

When the switch 404a on the screen 420 of FIG. 8 is pushed, as illustrated in FIG. 9, the screen of the display unit 40 is changed to a screen 425 to which data for a layout of the positional relationship of the lens with respect to the target lens shape is input. For example, the screen is switched to the input screen 425 for a layout of the optical center OC of the lens LE with respect to the geometric center FC of the target lens shape. By displaying the screen 425, the operator may recognize that inputting of layout data is needed in this stage. By touching display fields of numerical values of the screen 425, layout data including the papillary distance PD of a wearer, the height of the optical center OC with respect to the geometric center FC, and the like may be input. The input layout data is stored in the memory 51. In addition, the input screen 425 for the layout may be a screen that also functions as the input screen 420 for the processing conditions of FIG. 8.

Figure 10:
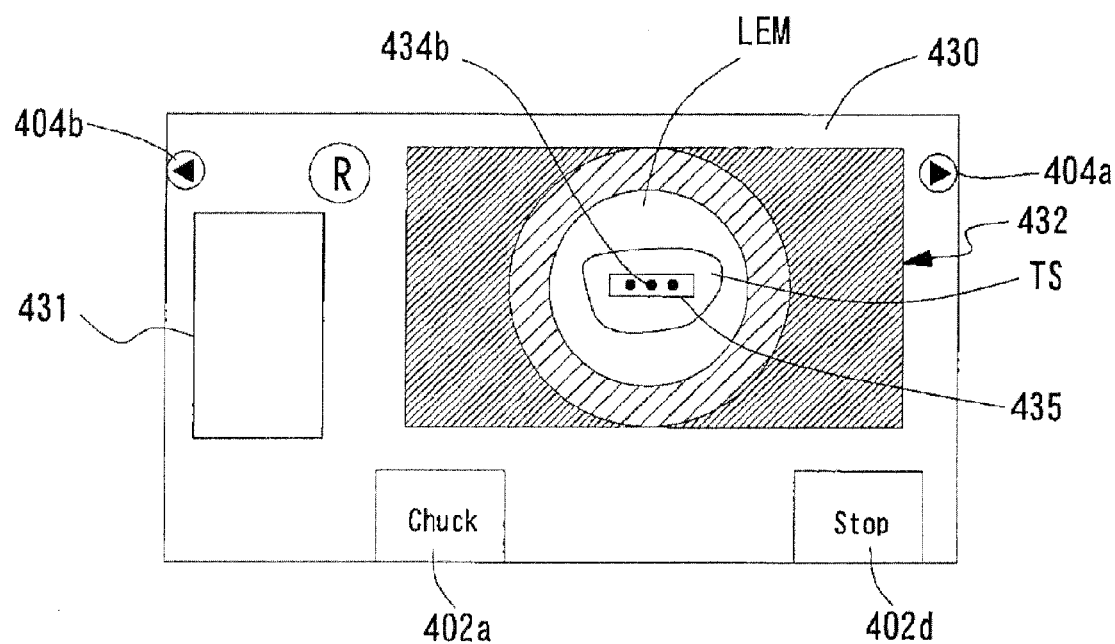
FIG. 10 is an example of a screen switched and displayed on a display unit.

When the switch 404a on the screen 425 of FIG. 9 is pushed, in the next step, the screen of the display 40 is switched to a screen 430 illustrating a transition to the cup attaching process by the blocker unit 500 as illustrated in FIG. 10. Accordingly, the operator may recognize that the cup attaching work is needed. In addition, the screen 430 is a display example in a case where the lens LE for the right eye is selected by a switch 402b.

The cup attaching operation using the blocker unit 500 will be simply described. The operator places an unprocessed lens LE on the support pins 505 of the blocker unit 500. The lens LE is illuminated by the illumination optical system 520, and the image of the lens LE is taken by the imaging element 534. A lens image LEM taken by the imaging element 534 is displayed on a display portion 432 of the screen 430. The lens image LEM also includes an image 434b of a printed dot mark that is attached in advance. In the display portion 432, a target lens shape figure TS for the right eye obtained by the eyeglass frame shape measuring unit 30 is displayed by being synthesized (superimposed) with the lens image LEM. The display position of the target lens shape figure TS on the display portion 432 is determined on the basis of the layout data and selection of the position of the cup attaching center, and the display of the target lens shape figure TS is controlled by the control section 50. In addition, the display portion 432 displays a guide mark 435 for aligning the position of the printed dot mark image 434b, which is synthesized (superimposed) with the lens image LEM. As the operator moves the lens LE to enable the guide mark 435 and the printed dot mark image 434b have a predetermined positional relationship, the position of the reference axis L01 may be aligned with the cup attaching center of the lens LE. In addition, by observing the positional relationship between the outside diameter of the lens image LEM and the target lens shape figure TS, whether or not a lens diameter from the target lens shape (peripheral edge processing shape) is insufficient may be confirmed. In addition, a display portion 431 displays setting data for the layout data and the processing conditions (detailed illustration is omitted).

After completing the alignment of the position of the lens LE, as described above, the operator rotates the lever 564 in the downward direction and further lowers the lever 564. Accordingly, the cup CU is attached to the surface of the lens. The cup CU is attached to the lens LE for the left eye in the same order.

Figure 11:
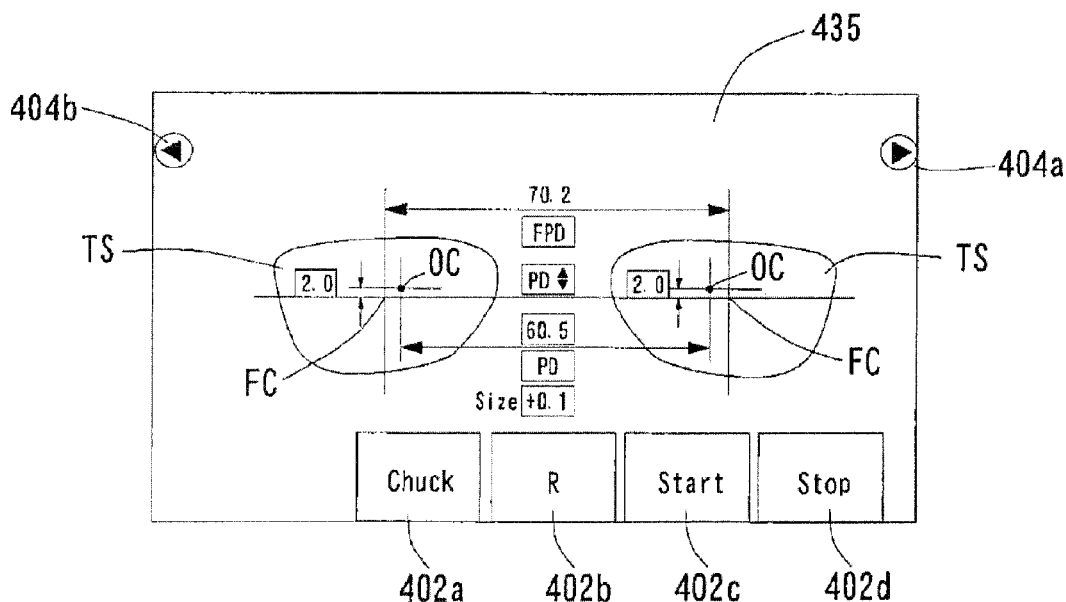
FIG. 11 is an example of a screen switched and displayed on a display unit.

When the switch 404a on the screen 430 is pushed, as illustrated in FIG. 11, a screen 435 illustrating a transition to a stage in which lens processing is able to be performed by the lens processing mechanism 10 is displayed. For example, on the screen 435, a switch 402c that inputs a signal for allowing the lens processing mechanism section 10 to start processing of the lens LE is displayed. In addition, the switch 402b that inputs a signal for selecting any of the left and the right of the lens LE to be processed is displayed. Accordingly, the operator may recognize that the stage proceeds to the stage of performing the processing of the lens LE as the next stage. In addition, at the center of a screen 435, as in FIG. 9, a display for checking the layout data is made.

The operator opens the window 12 disposed above the lens processing mechanism section 10 and holds the lens LE with the lens chuck shafts 102L and 102R. When a signal of the switch 402a is input, the motor 110 is driven by the control of the control section 50 to move the lens chuck shaft 102R. Thereafter, when the switch 402c is pushed, the control section 50 executes lens shape measurement using the lens shape measuring unit 200.

Figure 12:
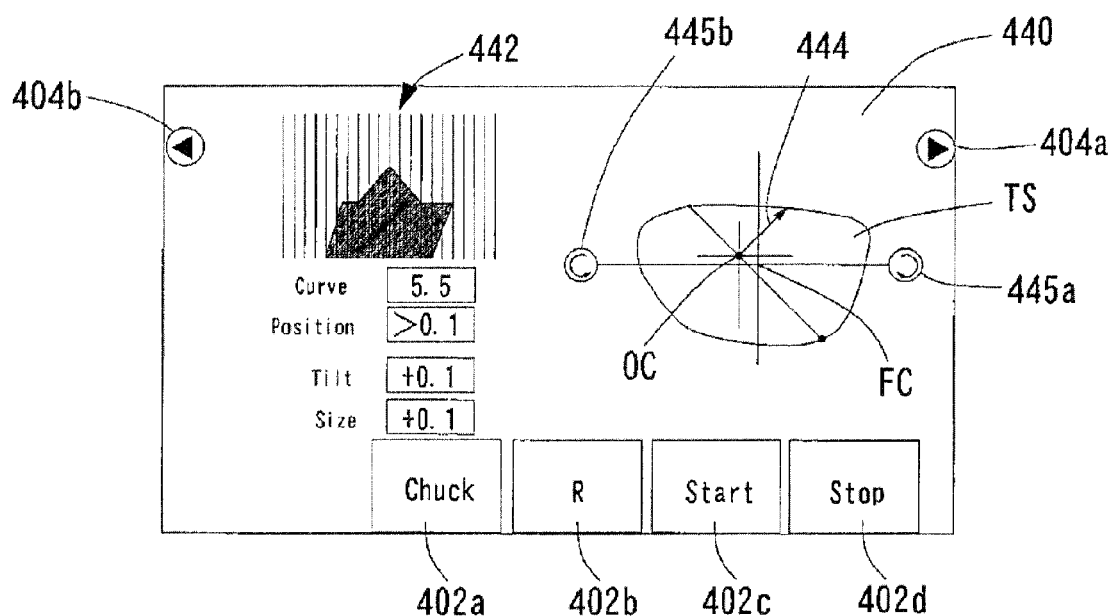
FIG. 12 is an example of a screen switched and displayed on a display unit.

After completing the lens shape measurement, when the switch 404a of the screen 435 of FIG. 11 is pushed, the screen is switched to a screen 440 of FIG. 12. The screen 440 is an example of a simulation screen during bevel-processing. On the screen 440, the target lens shape figure TS, and a FIG. 442 of a bevel cross-section at the edge position designated by a cursor 444 are displayed. The position of the cursor 444 may be changed by switches 445a and 445b. The bevel position for the lens edge during bevel-processing may be adjusted by changing the value of condition data of a display field 446. By displaying the screen 440, the operator may confirm whether or not it is appropriate to perform bevel-processing, and conditions of bevel-processing may be changed. In addition, when the switch 402c is pushed again, driving of the X-direction moving unit 100b and the Y-direction moving unit 100c is controlled, and processing of the peripheral edge of the lens LE is performed by the lens processing tool 168.

As such, since screens in a predetermined order according to the operation processes including rim shape measurement, cup attaching, and lens processing are sequentially switched and displayed on the basis of the input signals while the screens are switched, an operator who is unaccustomed to processing may also smoothly work. In addition, by following the switched displays of the screens, inputting of data needed for processing is accurately performed. Accordingly, the operator efficiently performs a series of the works including rim shape measurement, cup attaching, and lens processing.

In the embodiment, descriptions are given regarding an example having a configuration in which the switching signal is input from the control section 50 by operating the switch, and the control section 50 receives the input switching signal, thereby causing the screen to switch according to each of the operation processes (for example, rim shape measurement, cup attaching, and lens processing), but the embodiment is not limited thereto. In each of the operation processes, a detection unit is provided to detect an end of the operation (for example, detect a completion signal of rim shape measurement). The control section 50 outputs (inputs) the switching signal when detecting the completion of the operation. For example, when receiving the switching signal, the control section 50 performs displaying on the display 40 to switch from a screen for the current operation process to a screen for the next operation process. In the embodiment, the control section 50 serves as both the output unit (signal input unit) which outputs a switching signal for switching a screen and the reception unit which receives the switching signal. Naturally, the output unit and the reception unit may be configured so as to be separately provided.

For example, in the embodiment, descriptions are given regarding an example having a configuration in which after attaching the cup CU to the surface of the lens using the blocker unit 500, if the switch 404a on the screen 430 is pressed, the control section 50 outputs the switching signal causing the screen on the display to switch to a screen for the next operation process and receives the switching signal, thereby performing the switching from the screen 430 for a cup attaching process to the screen 435 for lens processing by the lens processing mechanism section 10, but the embodiment is not limited thereto. For example, a detection unit is provided to detect that the cup CU is attached to the surface of the lens. For example, the detection unit is disposed in the vicinity (surrounding) of the blocker unit 500. Naturally, the detection unit may not be disposed in the vicinity of the blocker unit 500. By disposing the detection unit in the vicinity of the blocker unit 500, a movement of the members configuring the blocker unit 500 is detected, and the attaching of the cup CU with respect to the surface of the lens is detected.

For example, if the detection unit detects that the cup CU is attached to the surface of the lens, the control section 50 outputs the switching signal. The control section 50 may be configured to perform displaying to switch from the operation step of the cup attaching process to a stage in which the lens can be processed in response to the reception of the switching signal. For example, the control section 50 may be configured to display guidance screen on the display unit 40 in order to cause the operator to execute the switching (for example, causing the operator to press the switch 404a, and the like), if the cup CU is detected to be attached to the surface of the lens. In addition, for example, the control section 50 may be configured to cause the display to switch from the screen 430 for the cup attaching process to the screen 435 for the lens processing, if the cup CU is detected to be attached to the surface of the lens. By having such a configuration, accordingly, the operator can easily recognize that the operation step proceeds to the stage of performing the processing of the lens LE as the next stage. In addition, a series of the processing operations (for example, operations from attaching of the cup CU to the lens processing) can be smoothly performed.

For example, as a configuration for detecting that the cup CU is attached to the surface of the lens, a configuration using a micro switch, an encoder, a load cell and the like can be exemplified. Naturally, a configuration including other than these may be used as a configuration for detecting the cup CU attached to the surface of the lens. For example, in a case of using the micro switch, when the movement support base 554 which is integrally attached to the arm 556 moves in a vertical direction with respect to the support column 552, the micro switch may be configured to be able to switch between ON and OFF by causing the movement support base 554 to come into contact with or to be released from contact with the micro switch attached to the support column 552. In this case, for example, in order to attach the cup CU to the surface of the lens, when the arm 556 is caused to be close to the lens, the micro switch is switched between ON and OFF by the movement of the movement support base 554. A configuration can be exemplified in which the control section 50 detects the switching of the micro switch between ON and OFF, and performs displaying to switch from the screen 430 for the cup attaching process to the screen 435 for the lens processing.

A configuration may be provided in which when attachment of the cup CU to the right and lens lenses is completed, displaying is performed to switch from the screen for the cup attaching process (operation) to the screen for the lens processing. For example, when detecting the cup CU attached to a lens on one side, the control section 50 performs displaying to switch from the screen for the cup attaching process of the lens on one side to the screen for the cup attaching process of the lens on the other side. Sequentially, when detecting the cup CU attached to a lens on the other side, the control section 50 performs displaying to switch from the screen for the cup attaching process to the screen for the lens processing. In such a case, for example, there is provided a right-left continuous blocking mode to proceed to the lens processing stage when the cup attaching is completed on the right and left lenses, and a normal blocking mode to proceed to the lens processing stage when the lens attaching is completed on one side. The control section 50 displays the screen for attaching the cup with respect to the right and left lenses when the right-left continuous blocking mode is selected, and performs displaying to switch to the screen for lens processing when the cup attaching is completed in both of the right and left lenses. By having such a configuration, the cup attaching can be continuously performed on the right and left lenses, and thus, when proceeding to the lens processing, it is possible to reduce frequent switching of processes in which after the lens processing is completed on one side, and still after the cup attaching is performed on the lens on the other side, the lens processing on the other side is performed. In addition, after the lens processing on one side is completed, while adjusting a frame insertion of the lenses, the lens processing on the other side can be performed, and thus, it is possible to perform the lens processing by driving the apparatus at all times. As described above, when the cup attaching is completed on the right and left lenses, a series of operations regarding the lens processing on the right and left can be smoothly performed by providing a configuration to proceed to the lens processing stage.

What is claimed is:

1. A system comprising:
a cup attaching unit configured to attach a cup, which is a processing jig, to a surface of an eyeglass lens;
a processing apparatus main body that includes a housing in which a lens processing mechanism with a processing tool configured to process a periphery of the eyeglass lens held by a lens chuck shaft is arranged;
a display which is arranged at the housing and is configured to display an operation step;
a signal input unit configured to input a switching signal to switch a screen of the display from a screen for a current operation step to a screen for a next operation step;
a controller configured to control the display to switch displaying the screen of the display from the screen for the current operation step to the screen of the next operation step based on the switching signal input by the signal input unit; and
a detector programmed to detect completion of each of the operation steps,
wherein the signal input unit inputs the switching signal when the detector detects that each of the operation steps is completed.

2. The system according to claim 1, wherein
the cup attaching unit includes a light source and is separated from the lens processing mechanism,
the signal input unit inputs the switching signal when the detector detects that the cup is attached to the surface of the lens by the cup attaching unit, and
the controller displays a guidance screen for switching on the display from a screen indicating that the operation step proceeds to the cup attaching operation by the cup attaching unit to a screen indicating that the operation step proceeds to a step in which the lens can be processed by the lens processing mechanism, based on the input of the switching signal.

3. The system according to claim 1, wherein
the cup attaching unit includes a light source and is separated from the lens processing mechanism,
the signal input unit inputs a switching signal when the detector detects that the cup is attached to the surface of the lens by the cup attaching unit, and
the controller switches displaying of a screen on the display from a screen indicating that a stage proceeds to the cup attaching operation by the cup attaching unit to a screen indicating that an operation proceeds to a stage in which the lens can be processed by the lens processing mechanism, based on the input of the switching signal.

4. The system according to claim 2, wherein
the cup attaching unit has a movement arm movable in a vertical direction, the movement arm holding a support arm to which a mounting portion on which a base portion of the cup is to be mounted is attached, and
the detector detects that the cup is attached to the surface of the lens by detecting a movement of the movement arm which moves in the vertical direction together with the mounting portion to attach the cup to the surface of the lens.

5. The system according to claim 4, wherein
the processing apparatus main body includes a base in which the lens processing mechanism is built in, and
the cup attaching unit is built into the base and is integrally arranged in the processing apparatus main body.

6. The system according to claim 3, wherein
the cup attaching unit has a movement arm movable in a vertical direction, the movement arm holding a support arm to which a mounting portion on which a base portion of the cup is to be mounted is attached, and
the detector detects that the cup is attached to the surface of the lens by detecting a movement of the movement arm which moves in the vertical direction together with the mounting portion to attach the cup to the surface of the lens.

7. The system according to claim 6, wherein
the processing apparatus main body includes a base in which the lens processing mechanism is built in, and
the cup attaching unit is built into the base and is integrally arranged in the processing apparatus main body.

8. A system comprising:
a cup attaching unit configured to attach a cup, which is a processing jig, to a surface of an eyeglass lens;
a processing apparatus main body that includes a housing in which a lens processing mechanism with a processing tool to process a periphery of the eyeglass lens held by a lens chuck shaft is arranged;
a display that is arranged in the housing;
a detection unit that is arranged in the vicinity of the cup attaching unit and is configured to detect that the cup is attached to the surface of the lens by the cup attaching unit;
a signal input unit configured to input a switching signal when the detection unit detects that the cup is attached to the surface of the lens by the cup attaching unit; and
a control unit configured to control the display to display a guidance screen for switching on the display from a first screen indicating that the operation step proceeds to the cup attaching operation by the cup attaching unit for one of right and left lenses to a second screen indicating that the operation step proceeds to the cup attaching operation by the cup attaching unit for the other of the right and left lenses based on the input of the switching signal, or control the display to switch the screen on the display from the first screen to the second screen based on the input of the switching signal.

9. The apparatus according to claim 8, wherein
after switching from the first screen to the second screen, the control unit displays the guidance screen for switching on the display from the screen to a third screen indicating that the operation step proceeds to a stage in which the lens can be processed by the lens processing mechanism based on the input of the switching signal or switches the screen on the display from the second screen to the third screen based on the input of the switching signal.

10. A system comprising:
a cup attaching unit configured to attach a cup, which is a processing jig, to a surface of an eyeglass lens;
a processing apparatus main body that includes a housing in which a lens processing mechanism with a processing tool configured to process a periphery of the eyeglass lens held by a lens chuck shaft is arranged;
a display which is arranged at the housing and is configured to display an operation step;
a signal input unit configured to input a switching signal to switch a screen of the display from a screen for a current operation step to a screen for a next operation step; and
a controller configured to control the display to switch displaying the screen of the display from the screen for the current operation step to the screen of the next operation step based on the switching signal input by the signal input unit;
wherein the cup attaching unit includes a light source and is separated from the lens processing mechanism.

11. The system according to claim 10, wherein
the signal input unit inputs the switching signal when a detection unit detects that the cup is attached to the surface of the lens by the cup attaching unit, and
the control unit displays a guidance screen for switching on the display from a screen indicating that the operation step proceeds to the cup attaching operation by the cup attaching unit to a screen indicating that the operation step proceeds to a step in which the lens can be processed by the lens processing mechanism, based on the input of the switching signal.

12. The system according to claim 10, wherein
the signal input unit inputs a switching signal when a detection unit detects that the cup is attached to the surface of the lens by the cup attaching unit, and
the control unit switches displaying of a screen on the display from a screen indicating that a stage proceeds to the cup attaching operation by the cup attaching unit to a screen indicating that an operation proceeds to a stage in which the lens can be processed by the lens processing mechanism, based on the input of the switching signal.

13. The system according to claim 11, wherein
the cup attaching unit has a movement arm movable in a vertical direction, the movement arm holding a support arm to which a mounting portion on which a base portion of the cup is to be mounted is attached, and
the detection unit detects that the cup is attached to the surface of the lens by detecting a movement of the movement arm which moves in the vertical direction together with the mounting portion to attach the cup to the surface of the lens.

14. The system according to claim 13, wherein
the processing apparatus main body includes a base in which the lens processing mechanism is built in, and
the cup attaching unit is built into the base and is integrally arranged in the processing apparatus main body.

15. The system according to claim 12, wherein
the cup attaching unit has a movement arm movable in a vertical direction, the movement arm holding a support arm to which a mounting portion on which a base portion of the cup is to be mounted is attached, and
the detection unit detects that the cup is attached to the surface of the lens by detecting a movement of the movement arm which moves in the vertical direction together with the mounting portion to attach the cup to the surface of the lens.

16. The system according to claim 15, wherein
the processing apparatus main body includes a base in which the lens processing mechanism is built in, and
the cup attaching unit is built into the base and is integrally arranged in the processing apparatus main body.

17. A system comprising:
a cup attaching unit configured to attach a cup, which is a processing jig, to a surface of an eyeglass lens;
a processing apparatus main body that includes a housing in which a lens processing mechanism with a processing tool configured to process a periphery of the eyeglass lens held by a lens chuck shaft is arranged;
a display which is arranged at the housing and is configured to display an operation step;
a signal input unit configured to input a switching signal to switch a screen of the display from a screen for a current operation step to a screen for a next operation step; and
a controller configured to control the display to switch displaying the screen of the display from the screen for the current operation step to the screen of the next operation step based on the switching signal input by the signal input unit,
further comprising a detector that detects completion of each of the operation steps,
wherein the signal input unit inputs the switching signal when the detector detects that each of the operation steps is completed.

* * * * *